US006694775B1

United States Patent
Higginbotham et al.

(10) Patent No.: US 6,694,775 B1
(45) Date of Patent: Feb. 24, 2004

(54) PROCESS AND APPARATUS FOR THE RECOVERY OF KRYPTON AND/OR XENON

(75) Inventors: Paul Higginbotham, Guildford (GB); Kelvin Graham Hayes, East Horsley (GB); Declan Patrick O'Connor, Chessington (GB)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/317,441

(22) Filed: Dec. 12, 2002

(51) Int. Cl.[7] ................................................. F25J 3/00
(52) U.S. Cl. ........................................... 62/643; 62/925
(58) Field of Search ........................... 62/643, 646, 925

(56) References Cited

U.S. PATENT DOCUMENTS

| | | | | |
|---|---|---|---|---|
| 3,191,393 A | * | 6/1965 | Dennis .......................... | 62/648 |
| 3,751,934 A | * | 8/1973 | Frischbier .................... | 62/653 |
| 3,779,028 A | * | 12/1973 | Schuftan et al. ............. | 62/648 |
| 4,277,363 A | * | 7/1981 | Duhayon et al. ............. | 588/1 |
| 4,568,528 A | * | 2/1986 | Cheung ........................ | 423/262 |
| 4,574,006 A | * | 3/1986 | Cheung ........................ | 62/648 |
| 4,805,412 A | * | 2/1989 | Colley et al. ................. | 62/648 |
| 5,039,500 A | * | 8/1991 | Shino et al. .................. | 423/262 |
| 5,833,737 A | | 11/1998 | Tamura et al. ............... | 95/98 |
| 5,913,893 A | | 6/1999 | Gary et al. .................... | 62/636 |
| 6,301,929 B1 | | 10/2001 | Lochner ....................... | 62/643 |
| 6,378,333 B1 | | 4/2002 | Dray ............................. | 62/648 |

FOREIGN PATENT DOCUMENTS

| | | | |
|---|---|---|---|
| DE | 19855485 | 10/1999 | ............. F25J/3/04 |
| JP | 09002808 | 1/1997 | .......... C01B/23/00 |

OTHER PUBLICATIONS

Research Disclosure Sep. 1999, Publication No. 42517, p. 1158, "Crude Krypton/Xenon Recovery from a Pumped LOX AUS Cycle", Disclosed Anonymously.

* cited by examiner

*Primary Examiner*—William C. Doerrler
(74) *Attorney, Agent, or Firm*—Willard Jones, II

(57) ABSTRACT

Krypton and/or xenon is separated crudely from a mixture comprising oxygen and at least one rare gas selected from the group consisting of krypton and xenon in a process comprising feeding said mixture or a mixture derived therefrom to a rare gas recovery system and separating said mixture feed in said rare gas recovery system into rare gas-lean gaseous oxygen ("GOX") and rare gas-enriched product. The process is characterized in that at least about 50 mol % of said mixture is fed to the rare gas recovery system in the gaseous phase provided that, when said mixture feed is separated by selective adsorption, the concentration of xenon in the mixture feed is no greater than 50 times the concentration of xenon in air. One advantage of a preferred embodiment of the present invention is that it can easily be retrofitted to existing pumped LOX cycle ASUs.

41 Claims, 8 Drawing Sheets

PROCESS AND APPARATUS FOR THE RECOVERY OF KRYPTON AND/OR XENON

BACKGROUND OF THE INVENTION

The present invention relates generally to the field of air separation and has particular reference to the crude recovery of at least one rare gas selected from the group consisting of krypton and xenon from an oxygen product of an air separation.

Krypton and xenon are present in air at very low concentrations, typically about 1.14 parts per million ("ppm") and about 0.087 ppm respectively. They are both valuable gases and, thus, there is an economic incentive to maximise their recovery in an air separation process.

In typical cryogenic air distillation processes, krypton and xenon concentrate in the liquid oxygen ("LOX") product taken from the bottom of the low pressure ("LP") distillation column as they are far less volatile than oxygen. The smaller the LOX flow, therefore, the more concentrated the krypton and xenon in this product.

In cryogenic air distillation processes in which most of the oxygen product is removed from the LP column in the gas phase, it is possible to make sure that very little krypton and xenon is lost in the gaseous oxygen ("GOX") by removing the GOX several distillation stages above the bottom of the LP column. These bottom guard stages are used mainly to prevent excessive loss of krypton which is substantially more volatile than xenon. Almost all of the krypton and xenon entering the air separation plant can then be recovered in the LOX product, which is a very small proportion of the total oxygen flow. This LOX product can then be processed to produce a purified rare gas product. In the event that it is primarily a xenon product that is required, one could dispense with the bottom guard stages and still recover much of the krypton and almost all of the xenon entering the plant in the LOX product.

If the LOX flow from the distillation process is much greater, for example when all the oxygen is withdrawn from the distillation column as LOX, pumped to the required pressure and evaporated in the main heat exchanger, the loss of krypton and xenon is much greater, even when the LOX is taken several stages up the LP column, separately from the liquid stream in which is concentrated the rare gas components. Essentially all of the krypton and xenon entering the air separation plant flows down the LP column to the sump of the LP column in the descending liquid, so any liquid withdrawal will remove a portion of the krypton and xenon proportional to the total liquid withdrawn as product. This will typically lead to losses of about 30% of these valuable products.

It is desirable, therefore, to increase the recovery of krypton and xenon from an air separation plant in which at least part of the oxygen product is withdrawn as LOX.

When a plant withdraws the main oxygen product as a vapor from the LP column, the krypton and xenon can be recovered by processing the LOX product as described above. However, for existing pumped LOX cycle plants, there is usually no small stream having concentrated rare gas components as all oxygen products are generally withdrawn from the bottom of the LP column. Therefore, as krypton and xenon are so valuable, it is also desirable to be able to retrofit rare gas recovery systems to existing plants.

In addition, it is desirable to provide a xenon and/or krypton recovery plant, which can process rare gas-enriched feed streams from an external source.

U.S. Pat. No. 4,805,412 (Colley; published on Feb. 21, 1989) discloses a process and apparatus for the cryogenic distillation of air with reduced loss of krypton and xenon. Oxygen is withdrawn from the LP column of the distillation system and is fed to a primary krypton column for extraction of its krypton and xenon content. The main feed to the primary krypton column is a stream of LOX but a small stream of GOX is also taken from the LP column and is fed without pressure adjustment to the krypton column. The LP column and the primary krypton column operate at substantially the same pressure. A portion of the krypton-lean overhead vapor is condensed and fed to the primary krypton column as descending wash liquid.

U.S. Pat. No. 6,301,929 (Lochner; published on Oct. 16, 2001) discloses an air separation process in which a rare gas-lean LOX stream and a rare gas-enriched LOX stream are formed. The two liquid streams are pumped to a rare gas separation column operating at GOX product pressure. The rare gas-lean LOX stream is passed as reflux to the top of the column and the rare gas-enriched stream is passed to a lower section of the column. Rare gas-lean GOX product is withdrawn as overhead from the column and a further rare gas-enriched bottoms liquid stream is withdrawn. The reboiler/condenser in the sump of the column is sized to vaporize almost all the oxygen feed streams. As the oxygen feed streams are liquid, the reboiler/condenser must be large to vaporize all of the feed.

Research Disclosure No.42517 (disclosed anonymously in September 1999) discloses an air separation process in which the oxygen product is removed from the column system as LOX. The LOX stream is pumped to the oxygen product pressure and divided into two steams. The first stream is passed as reflux to the top of a rare gas column and the second stream is passed to a lower zone of the column. The relative proportions of the two streams are determined such that the column can reject methane. Rare gas-lean GOX product is withdrawn as overhead from the rare gas column and a rare gas-enriched bottoms liquid stream is withdrawn. The reboiler/condenser in the sump of the rare gas column must be sized to vaporize almost all the oxygen feed streams. As the oxygen feed streams are liquid, the reboiler/condenser must be large to vaporize all of the feed.

DE-A-19855485 (Lochner; published on Jun. 10, 1999) discloses an air separation process in which rare gas-lean LOX and rare gas-enriched LOX are formed in the LP column. The two liquid streams are pumped to a rare gas column, the lean stream being passed as reflux to the top of the column and the enriched stream being passed to a lower section of the column. In addition, some gaseous nitrogen ("GAN") is added to the bottom of the rare gas column to strip liquid descending the column. Rare gas-lean GOX overhead is returned to the LP column and a further rare gas-enriched LOX stream is withdrawn.

U.S. Pat. No. 6,378,333(Dray; published on Apr. 30, 2002) discloses an air separation process in which a first LOX stream having a xenon component is passed from the LP column to the upper portion of a xenon concentrator column as reflux. In the xenon concentrator column, the LOX feed is separated into xenon-rich bottoms liquid and xenon-lean GOX overhead. A second LOX stream having a xenon component is withdrawn from LP column, pressurized and partially vaporized against a portion of feed air. Typically, the liquid fraction from this partial vaporization will be also passed as feed to the xenon concentrator column.

U.S. Pat. No. 5,913,893 (Gary et al; published on Jun. 22, 1999) discloses a method of purification of a cryogenic fluid, especially liquid helium, by filtration and/or adsorption. The impurities are filtered/adsorbed from the fluid but are not available as a valuable product.

U.S. Pat. No. 5,039,500 (Shino et al; published on Aug. 13, 1991) discloses the gasification of a small LOX purge stream taken from an air separation unit ("ASU") and passing the gaseous stream through an adsorber which selectively adsorbs xenon. Xenon is recovered during the regeneration phase of the adsorber. The xenon concentration in the purge stream is about 31 ppm, i.e. about 360 times the concentration of xenon in air.

JP-A-09002808 (Takano et al; published on Jan. 7, 1997) discloses the gasification of a small LOX purge stream taken from an ASU and passing the gaseous stream through a first adsorber (which selectively adsorbs xenon) and then through a second adsorber (which selectively adsorbs krypton). Xenon and krypton are recovered during the regeneration phase of the adsorbers.

It is well known in the art that krypton and xenon will concentrate in oxygen liquid because of the extremely low volatility of these gases. Thus, it is a requirement in the prior art that a LOX stream be processed in order to recovery krypton and xenon. Most of the prior art additionally provides a small oxygen purge stream concentrated in krypton and xenon so that the crude recovery system will be smaller. There is no disclosure in the aforementioned prior art of the recovery of krypton and xenon from a warm product gaseous oxygen stream.

In prior art processes, if krypton and xenon recovery is required, it is generally necessary to design the LP column of an ASU so that a small rare gas-rich LOX purge can be withdrawn. Such modifications add significantly to the necessary capital investment and to the height to the LP column.

It is desirable to overcome disadvantages of (and thereby improve on) the exemplified prior art and to provide an air separation process that is able to produce a rare gas-enriched product (for further processing into purified krypton and/or xenon products) and a pure LOX product without involving the capital expense and running costs of a large reboiler/condenser or additional equipment such as an argon stripping column.

BRIEF SUMMARY OF THE INVENTION

The inventors have realized that crude xenon recovery can be achieved by contacting xenon- (and usually krypton-) containing vapor feed with a reflux liquid, even if the vapor feed has a low concentration of krypton and xenon and if the vapor feed is at a high pressure. Krypton can also be recovered. The recovered product may then be further processed to provide at least one purified krypton and/or xenon product. The expression "low concentration" used in the context of krypton and xenon in the vapor feed is intended to mean that the krypton and xenon concentration in the vapor feed is lower than in prior art purge streams but higher than in air.

According to a first aspect of the present invention, there is provided a process for the recovery of at least one rare gas selected from the group consisting of krypton and xenon from a mixture comprising oxygen and at least one rare gas selected from the group consisting of krypton and xenon. The process comprises feeding said mixture or a mixture derived therefrom to a rare gas recovery system and separating said mixture feed in said rare gas recovery system into rare gas-lean GOX and rare gas-enriched product. The process is characterised in that at least about 50 mol % of said mixture is fed to the rare gas-recovery system in the gaseous phase. When the mixture feed is separated by selective adsorption, the concentration of xenon in the mixture feed is no greater than 50 times the concentration of xenon in air.

The invention involves passing feed mixture, the bulk of which is oxygen and at least about half of which is gaseous, to a crude rare gas recovery system. The crude rare gas recovery system could be a column, a column system, a heat exchanger or an adsorber but, whatever the nature of the recovery system, krypton and/or xenon components are concentrated and the concentrated product (and purified oxygen product) recovered. Rather than processing a small purge stream rich in krypton and xenon, preferred embodiments of the invention are intended to process a larger GOX stream having a lower krypton and xenon concentration.

The feed is preferably at a pressure higher than that of the source from which it is taken, e.g. the cryogenic air distillation column from which it was originally withdrawn. The feed may be vaporized oxygen resulting from a pumped LOX cycle in an ASU, GOX from the warm-end of the main exchanger (possibly following compression) or may be from an oxygen pipeline. LOX may also be fed to the crude recovery system to provide refrigeration and/or reflux.

One advantage of the present invention is that it can be applied to existing plants producing oxygen. Such plants may be easily retrofitted with a crude recovery system according to the present invention such that the krypton and xenon in the existing oxygen product streams may be recovered without additional processing.

Preferably, at least 90 mol % of the mixture feed is gaseous. More preferably, all of the mixture feed is gaseous.

The process is applicable to the production of xenon-enriched product, krypton-enriched product and xenon- and krypton-enriched product.

The process may further comprise feeding a xenon-enriched stream to the rare gas-recovery system. The enriched stream may be at least partially gaseous or may be liquid and may be taken from a cryogenic air distillation system, which would usually be a different system to that generating the mixture.

The mixture may be taken from a GOX pipeline in which case it would usually be under pressure and may not further require pressurization. Alternatively, the mixture may be pressurized before being fed to the rare gas recovery system, for example, if it is removed from a LP column of an ASU.

The process may further comprise separating feed air in a cryogenic air separation unit ("ASU") into nitrogen-rich overhead vapor and liquid oxygen ("LOX"), pressurising at least a portion of said LOX to provide pressurized LOX and at least partially vaporizing at least a portion of said pressurized LOX to provide said mixture feed. In such processes, all of said at least a portion of said pressurized LOX is preferably vaporized to produce said mixture. The pressure of the mixture feed is preferably greater than the operating pressure of the part of the ASU producing said LOX. The LOX stream may be divided into at least two portions, each portion being vaporized at different pressures before being fed to the rare gas recovery system.

In one embodiment of the invention, the rare gas recovery system is a gas-liquid contact separation system and the process comprises contacting said mixture feed with LOX in the separation system to effect the separation.

In one arrangement of this embodiment, the gas-liquid contact separation system is a gas-liquid contact column with no distillation stages and the process comprises passing (e.g. bubbling) the mixture feed through LOX in said column to effect the separation.

In another arrangement, the gas-liquid contact separation system is a distillation system and the process comprises feeding said mixture to the distillation system for separation into said rare gas-lean GOX as overhead vapor and said rare gas-enriched product and feeding LOX to said distillation system as reflux. Preferably, the mixture is superheated prior to being fed to the distillation system.

Whether at least the majority of the mixture is fed to the distillation system in either gaseous or liquid state, the rare gas-lean overhead may be condensed, pressurised to a high pressure (e.g. using a pump) and then revaporised.

Where the gas-liquid contact separation system is a distillation system, the process may further comprise separating feed air in a cryogenic ASU into nitrogen-rich overhead vapor and LOX, removing a stream of LOX from the ASU, pressurizing at least a portion of said LOX stream to produce a stream of pressurized LOX, dividing said pressurized LOX steam into a major portion and a minor portion, at least partially vaporising said major portion to provide said mixture and feeding said minor LOX portion to the distillation system as reflux. All of said major portion is preferably vaporized to produce said mixture. Where the distillation system comprises a single distillation column, the process comprises feeding said mixture to the column for separation into said rare gas-enriched product and said rare gas-lean GOX and feeding said minor LOX portion to said column as reflux.

Where the gas-liquid contact separation system is a distillation system, the process may comprise separating feed air in a cryogenic ASU into nitrogen-rich overhead vapor and LOX, removing a stream of LOX from the ASU, pressurizing at least a portion of said LOX stream to produce a stream of pressurized LOX, at least partially vaporising at least a portion of said pressurized LOX steam to provide said mixture, condensing at least a portion of said rare gas-lean GOX overhead vapor by indirect heat exchange against a refrigerant to produce condensed overhead and feeding at least a portion of the condensed overhead to the distillation system as reflux. Preferably, all of said at least a portion of said pressurized LOX stream is vaporized to produce said mixture. If the distillation system comprises a single distillation column, then the process may comprise feeding said mixture to the column for separation into said rare gas-enriched product and said rare gas-lean GOX and feeding at least a portion of said condensed overhead to said column as reflux.

The distillation system may comprise one or more distillation columns. Usually, the system has only one column as this reduces the initial capital investment but systems having either two or three columns may be preferred in certain circumstances.

In one arrangement of this embodiment, the distillation system comprises at least a higher pressure ("HP") distillation column and a lower pressure ("LP") distillation column. The HP and LP columns are thermally integrated via a reboiler/condenser. The process comprises feeding said mixture to said HP column where it is separated into rare gas-depleted overhead vapor and rare gas-enriched bottoms liquid. Rare gas-enriched bottoms liquid is fed to said LP column after pressure adjustment for separation into said rare gas-lean GOX and said rare gas-enriched product. Rare gas-depleted overhead vapor is at least partially condensed by indirect heat exchange against rare gas-enriched product to produce at least partially condensed rare gas-depleted overhead, at least a portion of which is fed to the HP column as reflux. Liquid from or derived from the HP column is fed to the LP column as reflux. LOX may be fed to the HP column as reflux. LOX for reflux is typically produced by the separation of feed air in a cryogenic ASU. The HP column may be reboiled by at least partially vaporizing rare gas-enriched bottoms liquid by indirect heat exchange against a heating fluid.

In another arrangement of this embodiment, the distillation system comprises at least a higher pressure ("HP") distillation column, a medium pressure ("MP") distillation column and a lower pressure ("LP") distillation column. The HP and MP columns are thermally integrated via a first reboiler/condenser and the MP and LP columns are thermally integrated via a second reboiler/condenser. The process comprises feeding said mixture to said HP column where it is separated into first rare gas-depleted overhead vapor and first rare gas-enriched bottoms liquid. First rare gas-enriched bottoms liquid is fed to said MP column after pressure adjustment for separation into second rare gas-depleted overhead vapor and second rare gas-enriched bottoms liquid. First rare gas-depleted overhead vapor is at least partially condensed by indirect heat exchange against second rare gas-enriched bottoms liquid to produce at least partially condensed first rare gas-depleted overhead, at least a portion of which is fed to the HP column as reflux. Liquid from or derived from the HP column is fed to the MP column, the LP column or both as reflux. Second rare gas-enriched bottoms liquid is fed to said LP column for separation into said rare gas-lean GOX and said rare gas-enriched product. Second rare gas-depleted overhead vapor is at least partially condensed by indirect heat exchange against said rare gas-enriched product to produce at least partially condensed second rare gas-depleted overhead, at least a portion of which is fed to the MP column as reflux. Liquid from or derived from the MP column is fed to the LP column as reflux. The process may further comprise feeding LOX to the HP column as reflux. The LOX for this reflux is preferably produced by cryogenic separation of feed air.

In a further arrangement of this embodiment, the distillation system comprises at least a first distillation column and a second distillation column with first and second columns operating at the same pressure. The process comprises feeding said mixture to said first column for separation into rare gas-lean GOX and rare gas-enriched product, feeding said mixture to said second column for separation into rare gas-lean GOX and rare gas-enriched product, feeding LOX to said first column as reflux and feeding at least one liquid selected from the group consisting of rare gas-enriched product from the first column and LOX to said second column as reflux. The process may further comprise dividing a stream of said pressurized mixture into two equal portions and feeding one portion to each column.

In another embodiment, the gas-liquid contact separation system is at least one heat exchanger. In such an embodiment, the process comprises feeding said mixture to the bottom of the or each heat exchanger, condensing a portion of said mixture ascending through the passages of the or each heat exchanger by indirect heat exchange against refrigerant to produce condensed mixture and contacting ascending mixture with descending condensed mixture in the passages to effect the separation by dephlegmation. Preferably, the indirect heat exchange takes place in the upper portion of the or each heat exchanger. The or each heat exchanger may be reboiled by at least partially vaporizing rare gas-enriched product by indirect heat exchange against a first heating fluid. The process may further comprise warming the rare gas-lean GOX to ambient temperature by indirect heat exchange within the or each heat exchanger against a second heating fluid, said heat exchange taking place above the heat exchange to produce the condensed mixture.

In a third embodiment, the rare gas recovery system is an adsorber system and the process comprises contacting said mixture feed with rare gas selective adsorbent material in the adsorber system to effect the separation. The process may be either a pressure swing adsorption ("PSA") process or a temperature swing adsorption ("TSA") process, both of which are well-known in the art.

The concentration of xenon in the mixture feed is no more than 50 times, preferably no more than 20 times and most preferably about 5 times, the concentration of xenon in air.

The separation is usually a crude separation and the rare gas-enriched product may be further processed to produce at least one product selected from the group consisting of a purified xenon product, a purified krypton product and a purified krypton and xenon product. Such further processing steps are well known in the art and include combusting the rare gas-enriched product to remove hydrocarbon compounds followed by further purification of the resultant product by distillation.

At least one further adsorber may be used to remove hydrocarbon compounds, carbon dioxide and/or nitrous oxide from LOX or GOX feed streams to the rare gas recovery system or from intermediate or final LOX or GOX streams.

According to a second aspect of the present invention, there is provided apparatus for the recovery of at least one rare gas selected from the group consisting of krypton and xenon from a mixture comprising oxygen and at least one rare gas selected from the group consisting of krypton and xenon according to the first aspect, said apparatus comprising a cryogenic ASU for separating feed air into nitrogen-rich overhead vapor and LOX, ressurizing means for pressurizing at least a portion of said LOX to provide pressurized LOX, vaporizing means for vaporizing at least about 50 mol % of said pressurized LOX to provide said mixture, and a rare gas recovery system for separating said mixture into rare gas-lean GOX and rare gas-enriched product.

The rare gas recovery system may be a gas-liquid contact column with no distillation stages. The mixture is passed (e.g. bubbled) through LOX in such a column.

The rare gas recovery system may also be a distillation system. Such apparatus may further comprise means for superheating said mixture prior to it being fed to the distillation system. The apparatus may further comprise conduit means for feeding a portion of said pressurized LOX from the pressurizing means (e.g. a pump) to the vaporizing means and further conduit means for feeding the remaining portion of said pressurized LOX from the pump to the distillation system as reflux. The apparatus may further comprise heat exchange means for at least partially condensing a portion of said rare gas-lean GOX overhead against a refrigerant to provide at least partially condensed rare gas-lean GOX overhead and conduit means for feeding at least a portion of said at least partially condensed overhead to the distillation system as reflux.

In a preferred embodiment where the rare gas recovery system is a distillation system, the apparatus may further comprise a first distillation column for separating mixture into rare gas-lean GOX and rare gas-enriched product, a second distillation column for separating mixture into rare gas-lean GOX and rare gas-enriched product at the same pressure as said first distillation column, conduit means for feeding LOX to the first distillation column as reflux and conduit means for feeding at least one liquid selected from the group consisting of rare gas-enriched product from the first distillation column and LOX to the second distillation column as reflux.

The rare gas recovery system may be at least one heat exchanger for separating the mixture by dephlegmation. The apparatus may further comprise first heat exchange means provided in the upper portion of the or each heat exchanger for condensing ascending mixture by indirect heat exchange against a refrigerant. The apparatus may further comprise second heat exchange means, e.g. provided in the lower portion of the or each heat exchanger, for vaporizing rare gas-enriched product by indirect heat exchange against a first heating fluid. The apparatus may further comprise third heat exchange means provided above the first heat exchange means in the or each heat exchanger for warming rare gas-lean GOX to ambient temperature by indirect heat exchange against a second heating fluid.

DETAILED DESCRIPTION OF THE INVENTION

Figure 1A:
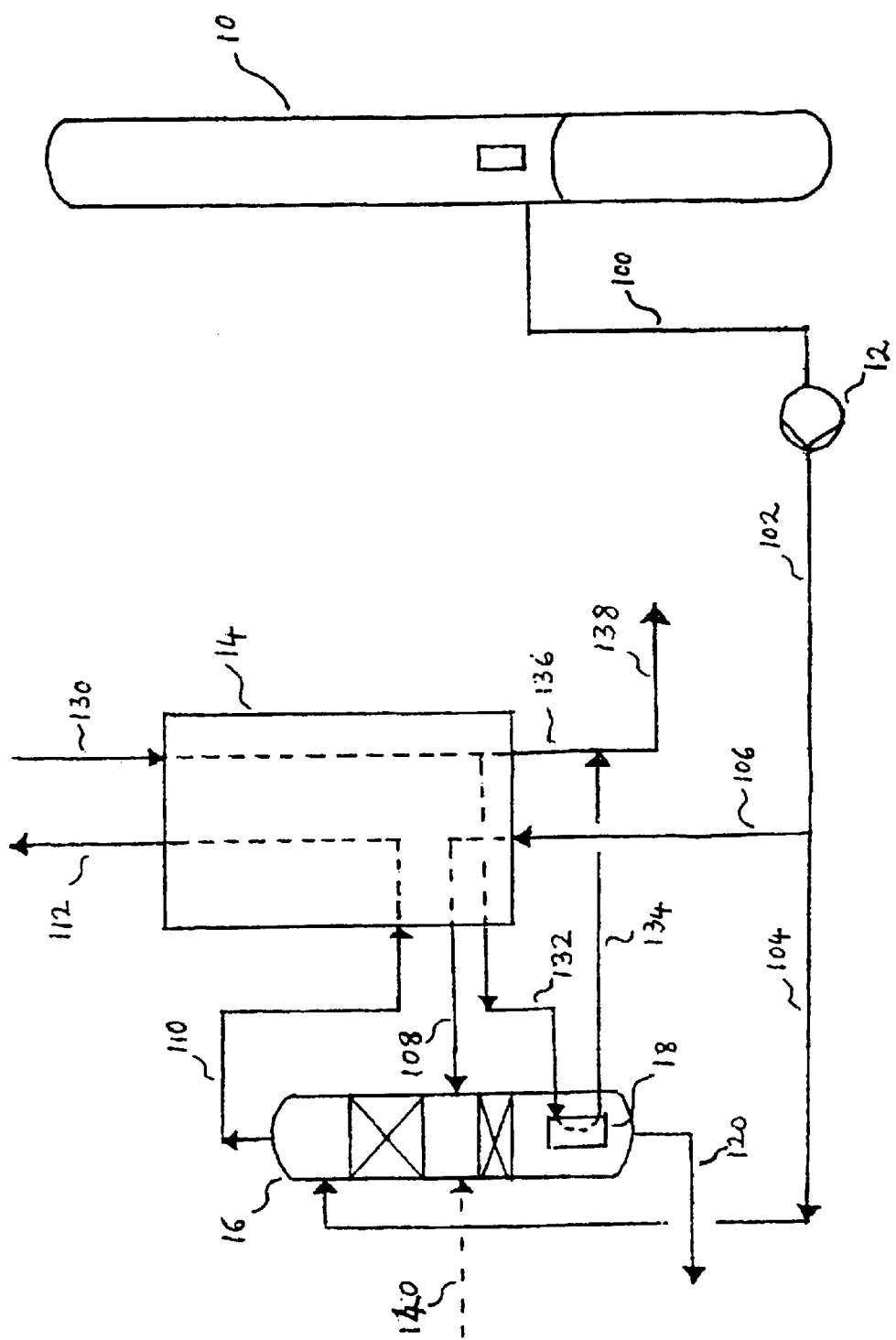
FIG. 1A is a schematic representation of an embodiment of the present invention in which the rare gas recovery system is a single distillation column.

Referring to FIG. 1A, LOX is withdrawn as stream 100 from the LP column 10 of a double column ASU. The LOX stream 100 is pumped by LOX pump 12 to provide a pumped LOX stream 102 which contains essentially all the krypton and xenon which has entered the double column ASU. The krypton and xenon concentration in the LOX is about 5 times greater than that in atmospheric air as the flow of stream 100 is typically 20% of the ASU feed air flow. The pumped LOX stream 102 is divided into two portions. The major portion 106 is vaporized to at least a quality of 0.9 (i.e. 90% of the stream is gaseous) in the heat exchanger 14 against a condensing compressed air stream 130. Ideally, the major portion 106 is completely vaporized and slightly superheated. The resultant vaporized stream 108 is passed to a lower zone of a single crude rare gas recovery column 16. The minor portion 104 of the pumped LOX is passed as reflux to the top of the crude column 16. The flow of reflux stream 104 is determined by the desired recovery of krypton and xenon.

In the crude distillation column 16, separation is effected into overhead rare gas-lean GOX, which is withdrawn as stream 110 and warmed in the heat exchanger 14 to provide GOX stream 112, and rare gas-enriched bottoms liquid, which is withdrawn as product stream 120 and which can be further purified by known methods.

In heat exchanger 14, the LOX stream 106 is warmed and vaporized against a compressed feed air stream 130 (although other pressurized streams such as high pressure nitrogen could be used instead). Most of the compressed feed air stream 130 is withdrawn from the heat exchanger 14 as a stream 136 of liquefied air but a portion 132 is withdrawn from the heat exchanger 14 and liquefied in crude column reboiler 18 to provide a further stream 134 of liquified air. The two liquefied air streams are combined and the combined stream 138 is fed to the ASU double column system.

It should be noted that it is not necessary to the invention that the heating fluid for reboiler 18 should have the same composition as the fluid condensed by the boiling LOX in heat exchanger 14. In addition, the reboiler 18 may be provided outside the column 16 rather than in the sump of the column as shown. Further, if reboiler 18 is provided outside column 16, then it may be fed directly with liquid from column 16 or it may be located inside a pot fed by liquid from column 16. It should also be noted that, provided oxygen feed stream 108 is sufficiently superheated, then column 16 may not require a reboiler. The descending reflux liquid would then be largely vaporized by desuperheating of the feed stream 108.

Higher reflux flows in column 16 more easily wash the krypton and xenon components from the rising oxygen vapor. As stated, it is preferred that stream 108 should be completely gaseous. One reason for this is that any liquid in stream 108 will have to be vaporized in the reboiler 18 which necessitates increasing the size of the reboiler.

Crude column 16 is shown having two distillation sections. In the upper section, krypton and xenon are washed from the rising gas by the reflux liquid. The lower section is optional and serves to increase the concentration of krypton and xenon in the bottoms liquid. Although reflux for the crude column is shown as provided by LOX feed stream 104, this source of reflux could be supplemented by or replaced by use of a column condenser, driven by an appropriate refrigerant.

In principle, column 16 does not need any distillation stages at all. Oxygen feed stream 108 may be bubbled through liquid in the sump of column 16. Much of the xenon in the oxygen feed would transfer to the sump liquid. If the oxygen feed 108 is two-phase, then most of the xenon in the feed would be in the liquid phase. However, having at least one distillation stage, in addition to the reboiler, is highly preferred.

An optional rare gas-enriched stream 140, which may originate from a distillation column different from that from which the oxygen feed stream 108 originates, may be fed to the column 16. Typically, if present, stream 140 may be a rare gas-rich purge stream from a different air separation plant and it may be liquid or at least partially gaseous. This optional rare gas-enriched feed stream is applicable to any embodiment of the invention.

Figure 1B:
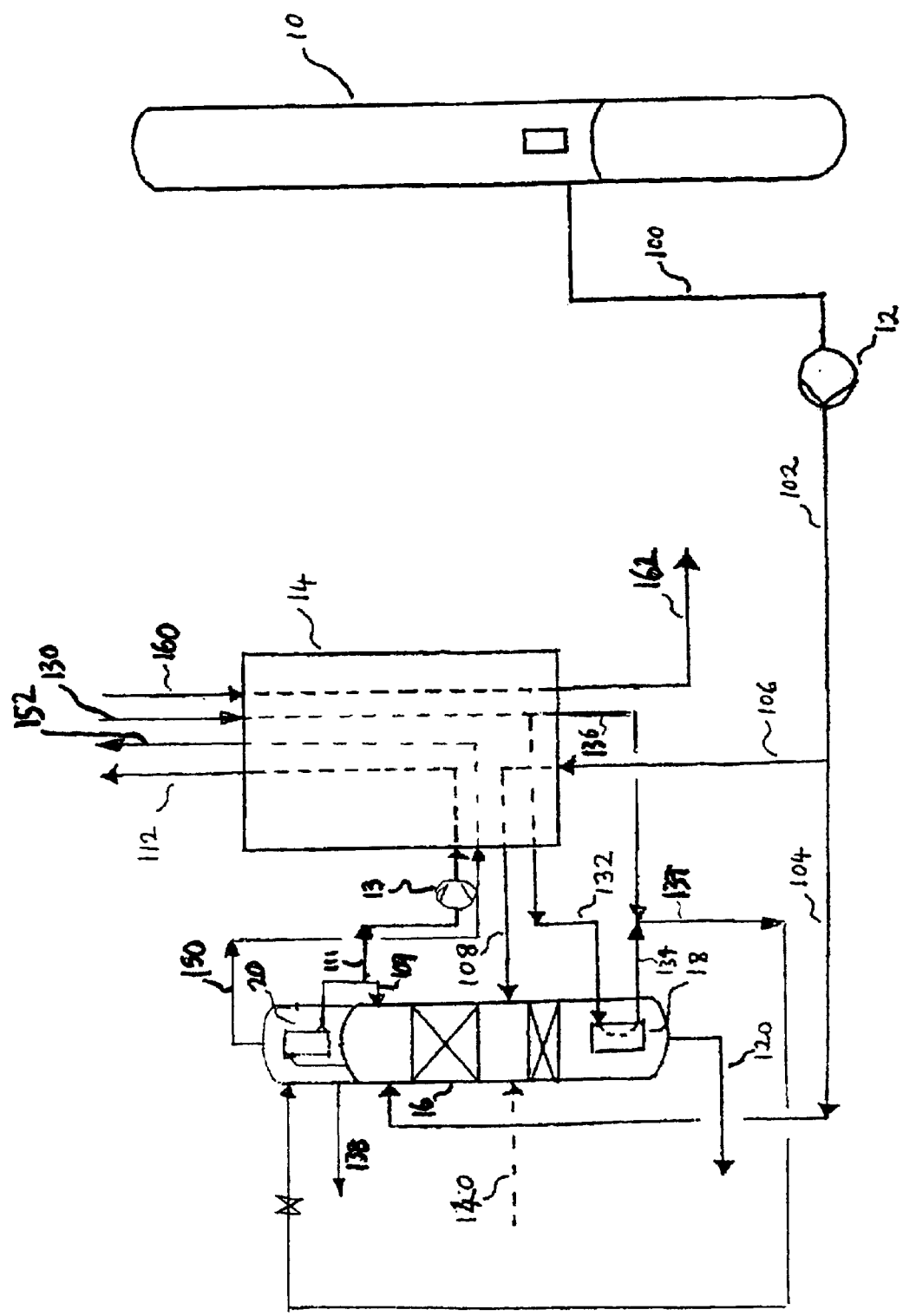
FIG. 1B is a schematic representation of a different arrangement of the embodiment of the present invention depicted in FIG. 1A.

The process depicted in FIG. 1B is similar to that depicted in FIG. 1A and the corresponding features have been given the same numerical legends.

In the crude distillation column 16, separation is effected into overhead rare gas-lean GOX, and rare gas-enriched bottoms liquid, which is withdrawn as product stream 120 and which can be further purified by known methods. The overhead rare gas-lean GOX is condensed in overhead condenser 20. A portion 109 of the resulting liquid is returned to the distillation column 16 as reflux and the remaining portion 111 is pumped to a higher pressure (preferably supercritical) in pump 13, vaporised (if subcritical) and warmed in the heat exchanger 14 to provide GOX stream 112. The warming (and evaporation if present) of this GOX stream is primarily against compressed air stream 160, which is cooled (and, if sub-critical condensed) to form stream 162 which is fed to the ASU double column system.

In heat exchanger 14, the LOX stream 106 is warmed and vaporized against a compressed feed or recycle air stream 130 (although other pressurized streams such as high pressure nitrogen could be used instead). Most of the compressed air stream 130 is withdrawn from the heat exchanger 14 as a stream 136 of liquefied air but a portion 132 is withdrawn from the heat exchanger 14 and liquefied in crude column reboiler 18 to provide a further stream 134 of liquified air. The two liquefied air streams are combined and the combined stream 137 is reduced in pressure and fed to the overhead condenser 20 of the distillation column 16. Here it is partially evaporated to produce a vapour stream 150 which is warmed in heat exchanger 14 to form stream 152. The remaining liquid 138 is fed to the ASU double column system. The vapour stream 152 may be recompressed to form all or part of the compressed air feed stream 130

It should be noted that it is not necessary to the invention that the heating fluid for reboiler 18 should have the same composition as the fluid condensed by the boiling LOX in heat exchanger 14 or the cooling fluid for condenser 20. It should also be noted that condenser 20 need not be located on the column, and its duty could be performed in the main heat exchanger 14.

Figure 2A:
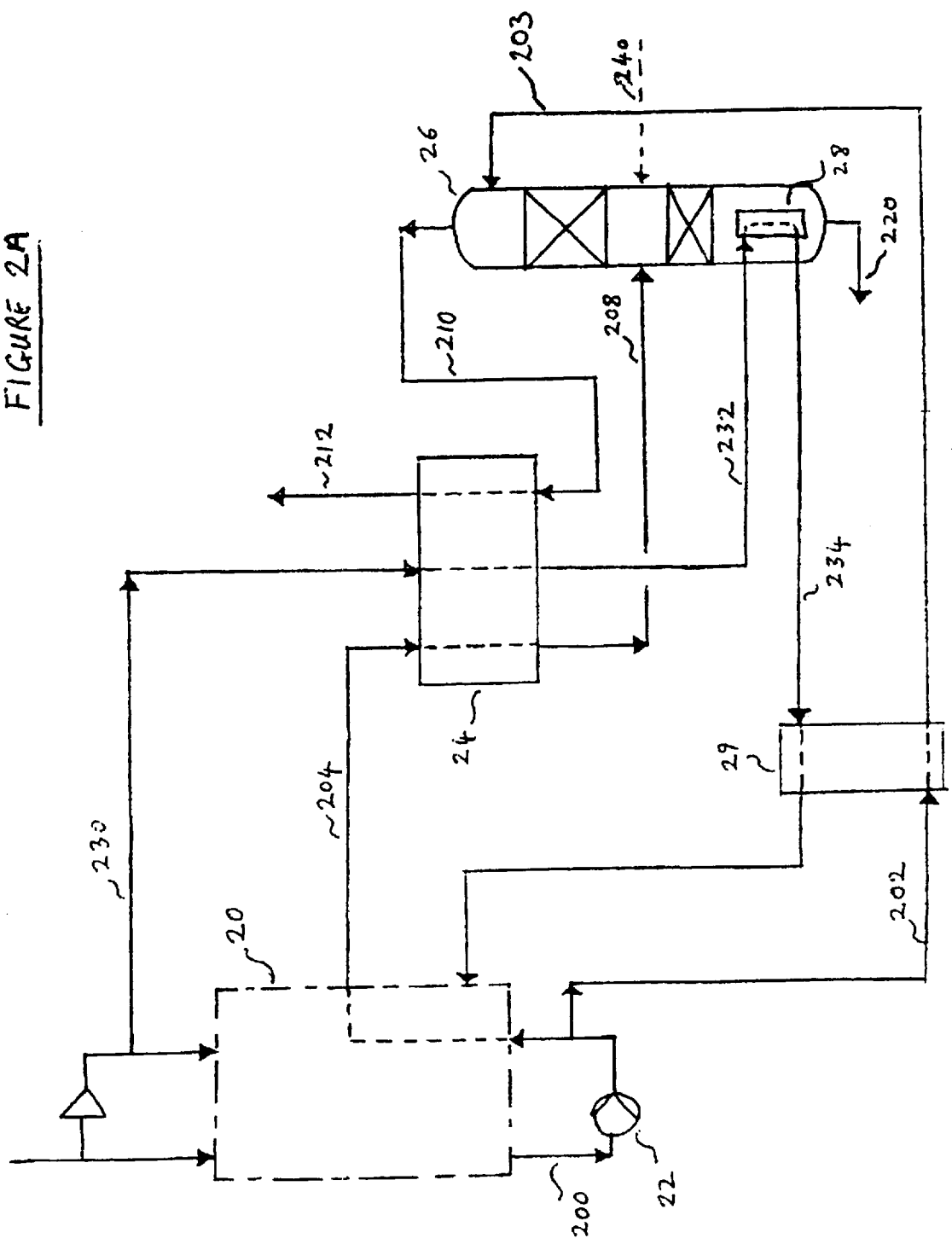
FIG. 2A is a schematic representation of another arrangement of the embodiment of the present invention depicted in FIG. 1.

Referring now to FIG. 2A, a stream 200 of LOX is withdrawn from a pumped LOX ASU coldbox 20 and pumped by LOX pump 22 to provide a pumped LOX stream which is divided into two portions. The major portion is vaporized within the coldbox 20 to provide a stream 204 of warm pressurized GOX. This stream contains most of the krypton and xenon which entered the pumped LOX ASU. The krypton and xenon concentration in the GOX is about 5 times higher than in atmospheric air as the flow of stream 200 is typically 20% of the ASU feed air flow. GOX stream 204 is cooled in heat exchanger 24 to provide stream 208 having a quality of at least 0.9. Ideally, stream 208 should be superheated. Stream 208 is fed to a lower section of a single crude rare gas recovery column 26. The remaining portion 202 of the pumped LOX stream from pump 22 is optionally warmed in heat exchanger 29 and fed as stream 203 to the top of column 26 to provide reflux and refrigeration.

In the crude distillation column 26, separation is effected into overhead rare gas-lean GOX, which is removed as stream 210 and warmed in heat exchanger 24 to provide GOX product stream 212, and rare gas-enriched bottoms liquid, which is withdrawn as a product stream 220 and which can be further purified by known methods.

A minor portion 230 of the pumped LOX ASU compressed feed air is cooled in heat exchanger 24 and the cooled stream 232 is fed to reboiler 28 where it is condensed. A stream 234 of condensed air is returned to the pumped LOX ASU, optionally after exchanging heat with LOX stream 202 in subcooler 29. Reboiler 28 may be located outside column 26, possibly inside its own pot if desired. Stream 230 does not have to be a boosted air stream. Any suitable pressurised stream (e.g. boosted nitrogen) could be used to provide the heating duty for reboiler 28. Further, the boosted stream providing the reboiler heating duty could be supplied directly to the reboiler as a cold stream from the main ASU 30, rather than a warm stream which is cooled in exchanger 24. Exchanger 24 might have other streams associated with it, e.g. stream 220 might be vaporised and warmed in said exchanger prior to its further purification.

The flow of reflux stream 203 is determined by the desired recovery of krypton and xenon. As in FIG. 1, it is preferred that stream 208 be completely gaseous as any liquid in stream 208 would have to be vaporized by the reboiler 28 which would necessitate increasing the size of the reboiler.

Column 26 is depicted as having two distillation sections. In the upper section, krypton and xenon are washed from the rising gas by the reflux liquid. The lower section is optional and serves to increase the concentration of krypton and xenon in the bottoms liquid. Although reflux for the crude column is shown as LOX feed stream 203, this source of reflux could be supplemented by or replaced by the use of a column condenser, driven by an appropriate refrigerant.

It can be readily appreciated from this figure that the invention is suited to the simple retrofit of a krypton and xenon recovery system to an existing pumped LOX ASU. GOX stream 204 and the compressed feed air stream 230 are both warm streams and, thus, are readily accessible for such a retrofit. The LOX stream 202 for reflux and refrigeration is readily supplied by connection outside the coldbox to the discharge line of the LOX pump 22. The compressed air, liquefied in the crude recovery equipment, is sent as line 234 to the ASU coldbox. It is simple to design the coldbox to easily route this stream to join the main ASU liquefied compressed feed air stream. Thus, retrofit of a rare gas recovery system is readily available for minimal initial capital investment.

Figure 2B:
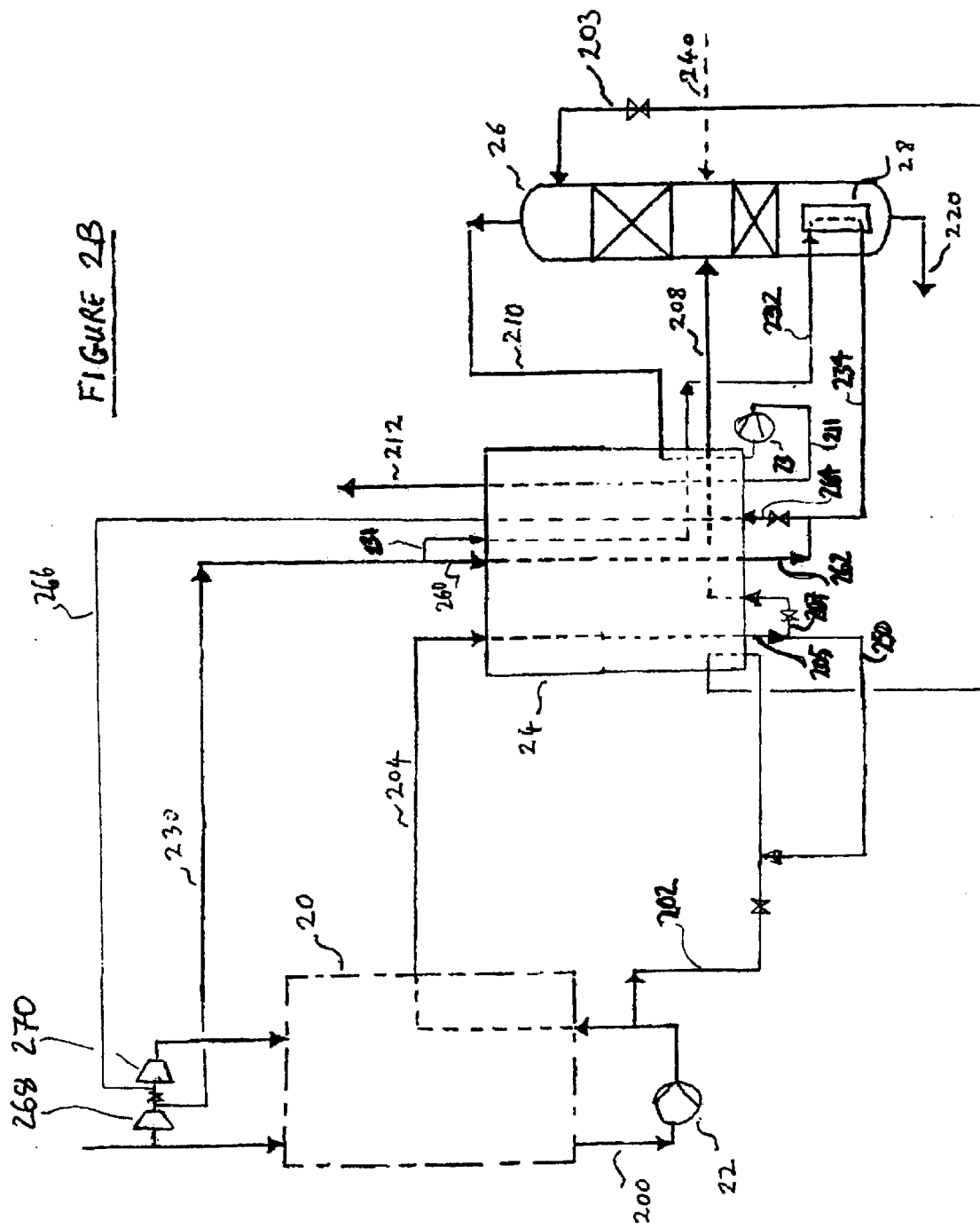
FIG. 2B is a schematic representation of a different arrangement of the embodiment of the present invention depicted in FIG. 2A.

The process depicted in FIG. 2B is similar to that depicted in FIG. 2A and corresponding features have been given the same numerical legends. A stream 200 of LOX is withdrawn from a pumped LOX ASU coldbox 20 and pumped by LOX pump 22 to provide a pumped LOX stream which is divided into two portions. The major portion is vaporized within the coldbox 20 to provide a stream 204 of warm pressurized GOX, which may be at a supercritical pressure. This stream contains most of the krypton and xenon which entered the pumped LOX ASU. The krypton and xenon concentration in the GOX is about 5 times higher than in atmospheric air as the flow of stream 200 is typically 20% of the ASU feed air flow. GOX stream 204 is cooled (and condensed if subcritical) in heat exchanger 24 to provide stream 205 which is a liquid or supercritical dense-phase stream. A portion 250 of stream 205 is mixed with LOX stream 202 and the remaining portion 207 is reduced in pressure and evaporated in the heat exchanger 24 primarily by condensing compressed air stream 230 to form stream 208 having a quality of at least 0.9. Ideally, stream 208 should be superheated. Stream 208 is fed to a lower section of a single crude rare gas recovery column 26. The remaining portion 202 of the pumped LOX stream from pump 22 is mixed with LOX stream 250, optionally heated in heat exchanger 24, reduced in pressure and fed as stream 203 to the top of column 26 to provide reflux and refrigeration.

In the crude distillation column 26, separation is effected into overhead rare gas-lean GOX, which is removed as stream 210 and rare gas-enriched bottoms liquid, which is withdrawn as a product stream 220 and which can be further purified by known methods. GOX stream 210 is condensed in heat exchanger 24, pumped to pressure in pump 23 and the pumped stream 211 re-warmed (and evaporated if subcritical) in heat exchanger 24 primarily against the incoming GOX stream 204 to provide GOX product stream 212. The pressure of stream 212 is similar to stream 204, and may, if the streams are supercritical, be higher.

Stream 230 of the pumped LOX ASU compressed feed air is split into two portions, a minor portion 231 and a major portion 260. Stream 231 is cooled in heat exchanger 24 and the cooled stream 232 is fed to reboiler 28 where it is condensed to form stream 234, Stream 260 is cooled and condensed in heat exchanger 24, primarily by evaporating oxygen stream 207, to form stream 262, which is mixed with stream 234 and reduced in pressure to form stream 264. This stream is evaporated and warmed in heat exchanger 24 to form stream 266, primarily by condensing GOX stream 210 and cooling air streams 260 and 261. Reboiler 28 may be located outside column 26, possibly inside its own pot if desired. The return air stream 266 is at a lower pressure than feed stream 230 and may be recompressed in a separate compressor (not shown) to form all or part of stream 230, or, as shown, may be returned to the suction of the compression stage 270 following the stage 268 from which stream 230 is withdrawn. Stream 230 will be a major portion of the flow through the compressor 268, so that little inefficiency is introduced by reducing the pressure of the remaining portion which goes directly to the following compression stage 270.

It can also be readily appreciated from this figure that the invention is suited to the simple retrofit of a krypton and xenon recovery system to an existing pumped LOX ASU. GOX stream 204 and the compressed feed air stream 230 and return air stream 266 are all warm streams and, thus, are readily accessible for such a retrofit. The LOX stream 202 for reflux and refrigeration is readily supplied by connection outside the coldbox to the discharge line of the LOX pump 22. Thus, retrofit of a rare gas recovery system is readily available for minimal initial capital investment.

Figure 3:
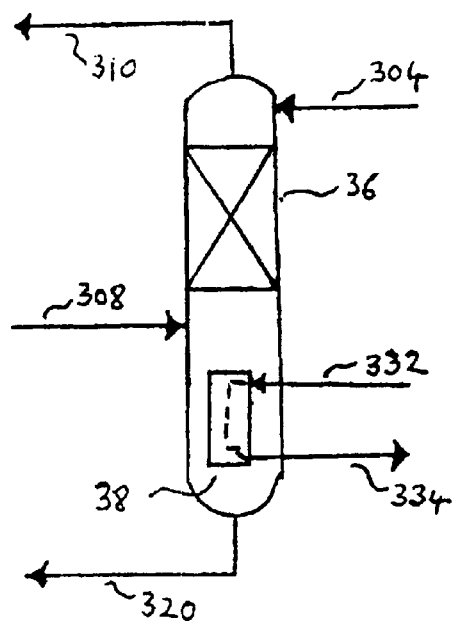
FIG. 3 is a schematic representation of the distillation column depicted in FIGS. 1A, 1B, 2A and 2B without the optional bottom section of distillation stages.

FIG. 3 depicts a crude krypton and xenon recovery column 36 that is similar to that used in the processes depicted in FIGS. 1 and 2. Column 36 differs from the columns of FIGS. 1 and 2 in that the optional bottom section of stages are omitted.

The main rare gas-containing oxygen feed to column 36 is stream 308 which is at least 90% gaseous. The oxygen feed is separated in column 36 into rare gas-lean GOX overhead, which is removed as stream 310, and rare gas-enriched LOX bottoms, which is removed as stream 320.

Column 36 is refluxed by a stream 304 of LOX fed to the top of the column. The flow of LOX reflux stream 304 determines the losses of xenon and particularly of the more volatile krypton in the overhead vapor. Selection of the LOX reflux/feed GOX flow determines the liquid to vapor ("L/V") flow ratio.

It should be noted that, in FIG. 3, stream 304 is typically a fraction of the pumped LOX and thereby contains the same krypton and xenon concentrations as the feed GOX stream 308. Thus, the overhead GOX stream 310 will be in equilibrium with LOX stream 304 and so will contain some krypton and xenon. It is within the scope of the invention to replace or supplement stream 304 by use of a column condenser in which part of the overhead gas is condensed against a suitable refrigerant and returned to the column as reflux, optionally with a small fraction withdrawn as rare gas-lean LOX product.

FIG. 3 shows only a single column section but, optionally, there may be a bottom section located between feed 308 and reboiler 38. Such an additional column section would help to concentrate the krypton and xenon in the bottom product.

A stream 332 of heating fluid, e.g. compressed feed air, is condensed in reboiler 38 against boiling rare gas-enriched liquid in the sump of the column 36 providing a condensed heating fluid stream 334. It should be noted that the reboiler 38 could be deleted provided that the feed stream 308 is sufficiently superheated. The refrigeration necessary to desuperheat the feed stream would then be provided by vaporizing downflowing LOX in the column such that only stream 320 remained.

Figure 4:
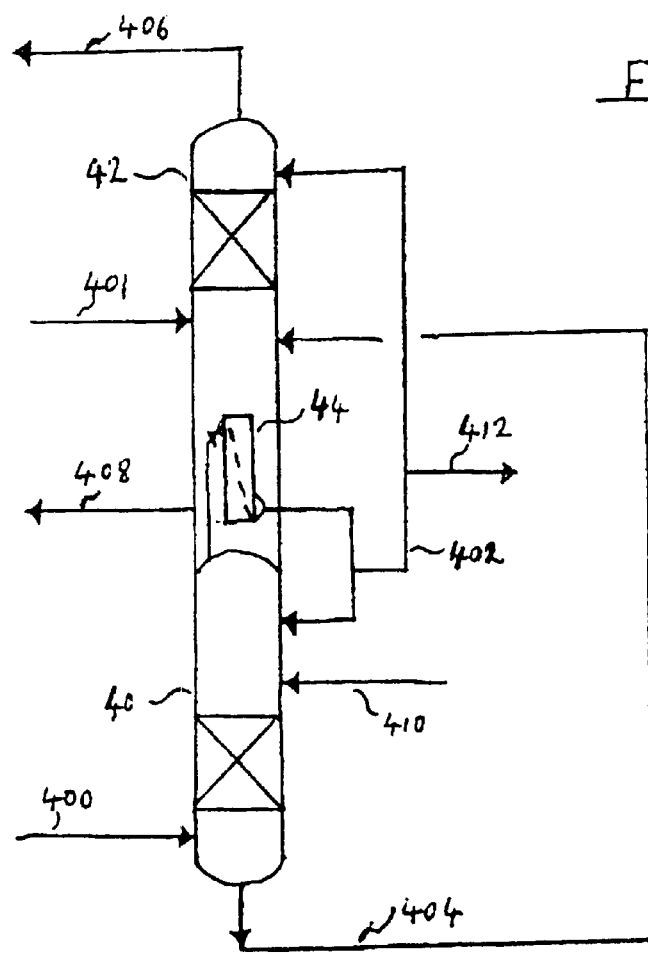
FIG. 4 is a schematic representation of an embodiment of the present invention in which the rare gas recovery system has two distillation columns operating at different pressures.

FIG. 4 depicts a crude rare gas recovery system comprising a HP column 40 thermally integrated with a LP pressure column 42 via a reboiler 44. Oxygen feed stream 400, having a vapor quality of at least 0.9 and containing more krypton and xenon than atmospheric air, is fed to a lower portion of HP column 40. Ideally, feed stream 400 is in the gaseous state.

In HP column 40, separation is effected into overhead rare gas-depleted vapor and rare gas-enriched bottoms liquid. The enriched bottoms liquid is withdrawn as stream 404 and is fed to a lower zone of LP column 42 where it is separated into rare gas-lean product, which is removed as stream 408 and further processed if required to provide purified krypton and/or xenon products, and rare gas-enriched overhead vapor, which is removed as stream 406. The overhead vapor from HP column 40 is at least partially condensed in reboiler 44 against boiling rare gas-lean product to provide at least partially condensed overhead. A portion of the condensed overhead is used as reflux for HP column 40 and the remainder is fed as stream 402 to LP column 42 as reflux. A portion of stream 402 can optionally be withdrawn as rare gas-depleted LOX product in stream 412.

Typically, the flowrate of stream 402 will be approximately half of the flow leaving reboiler 44, so that the L/V ratio in both columns is similar. The L/V ratio will be about 0.5 if oxygen feed stream 400 is all vapor as preferred. The higher the L/V ratio, the more difficult it is for xenon and particularly for krypton to escape from the column system.

The pressure difference between the two columns will tend to be small because the composition of fluids on both side of reboiler 44 will be similar. Thus, there will be issues to consider in liquid transfer from HP column 40 to LP column 42. One or more pumps might be necessary to accomplish this transfer. Alternatively, GOX vapor could be injected into the transfer lines thereby using "vapor lift" to accomplish the liquid transfer.

The columns are depicted as stacked with LP column 42 located above HP column 40. However, the invention also applies to arrangements where the two columns are side by side or even if HP column 40 were stacked above LP column 42.

The process represented in FIG. 4 uses only a single column section in columns 40 and 42 but, optionally, there could be more than one section. For example, in LP column 42 there could be a bottom section between feed 404 and the reboiler 44, which would help to concentrate the krypton and xenon in the bottom product.

The approximate column L/V ratio of 0.5 available for the above scheme may be higher than necessary to achieve the desired recovery of krypton and xenon. A lower L/V ratio would result if part of the oxygen vapor feed 400 to the crude recovery system is routed directly to a lower zone of the LP column 42 as optional stream 401. The higher the flow of LP column GOX feed stream 401, the lower the L/V ratio in the columns.

For a pumped LOX ASU, such as that shown in FIG. 1, the pumped oxygen is normally vaporized at a single pressure in the main exchanger. It would, however, be possible to divide the pumped LOX into two streams and vaporize the two streams at slightly different pressures for minimal power penalty. Such an arrangement would taking advantage of the fact that compressed air condenses over a temperature range (as it is a mixture of gases). Usually, there would be no incentive to take advantage of this capability, as customers do not want oxygen product at two slightly different pressures. However, such a capability would ideally match the process of FIG. 4 in which part of the GOX feed 401 can be supplied at a slightly lower pressure. Thus, the process depicted in FIG. 4 can deliver any column L/V ratio up to about 0.5 depending of the flow of optional stream 401 and on the quality and/or superheat of feed stream 400.

Refrigeration for the column recovery system is most easily supplied by use of a LOX feed stream although an external refrigerant could be used to exchange heat with a suitable stream from the crude recovery system. The LOX refrigerant stream would typically be part of the pumped LOX stream from the main ASU and can be routed to any location of the crude recovery column system. However, the most valuable arrangement would be where the LOX refrigerant is fed as stream 410 the top of HP column 40 as reflux for that column, thereby allowing an increase in the flow of reflux stream 402 to LP column 42.

A significant advantage of the arrangement depicted in FIG. 4 is that it only requires connections for LOX and GOX and is, thus, highly suited for retrofit to an existing pumped LOX ASU due to the few interconnections required.

Figure 5:
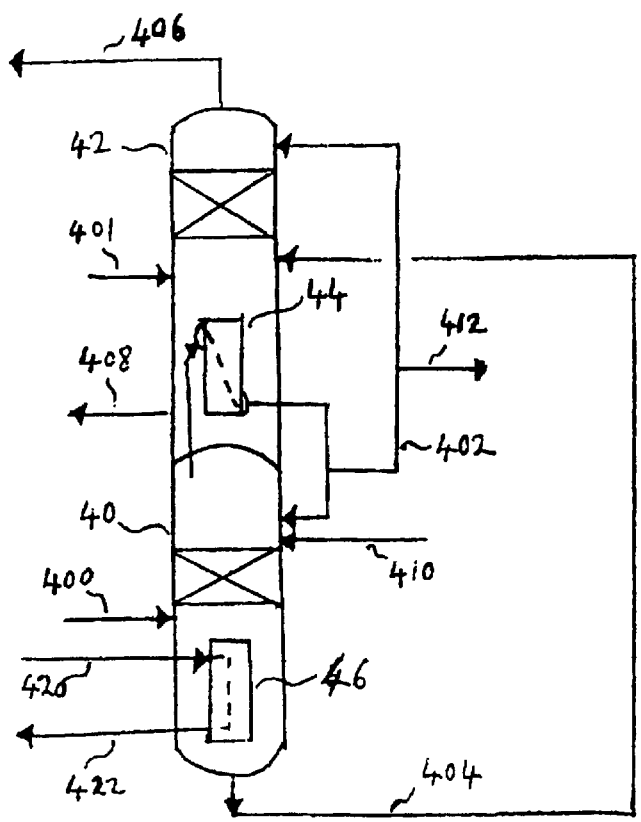
FIG. 5 is a schematic representation of a different arrangement of the embodiment of the present invention depicted in FIG. 4.

FIG. 5 depicts a similar arrangement to that depicted in FIG. 4 and, accordingly, the same numerical legends have been used in FIG. 5 to denote the features that correspond with those of FIG. 4. The arrangement in FIG. 5 has a reboiler 46 for the HP column 40. A stream 420 of heating fluid is used to boil the rare gas-depleted liquid bottoms in the HP column 40, thereby generating a condensed heating fluid stream 422. For example, the heating fluid in stream 420 may be a portion of the compressed air used to vaporize the pumped LOX in the main ASU. As this external heat is added to the crude recovery column system, extra refrigeration will be required as compared with the process of FIG. 4. The simplest way of providing this extra refrigeration is by increasing the flow of LOX refrigerant stream 410. Stream 410 is shown as being used as reflux for HP column 40 but it could instead be used as reflux for LP column 42.

The additional refrigeration could also be provided by use of external refrigerant in a condenser for the LP column 42.

The column L/V ratio in FIG. 4 is limited to approximately 0.5. However, the use of the reboiler 46 in the process of FIG. 5 can deliver higher L/V ratios depending primarily on the duty of reboiler 46. Such high L/V ratios could be employed to improve krypton recovery for cases having very high column operating pressures.

Figure 6:
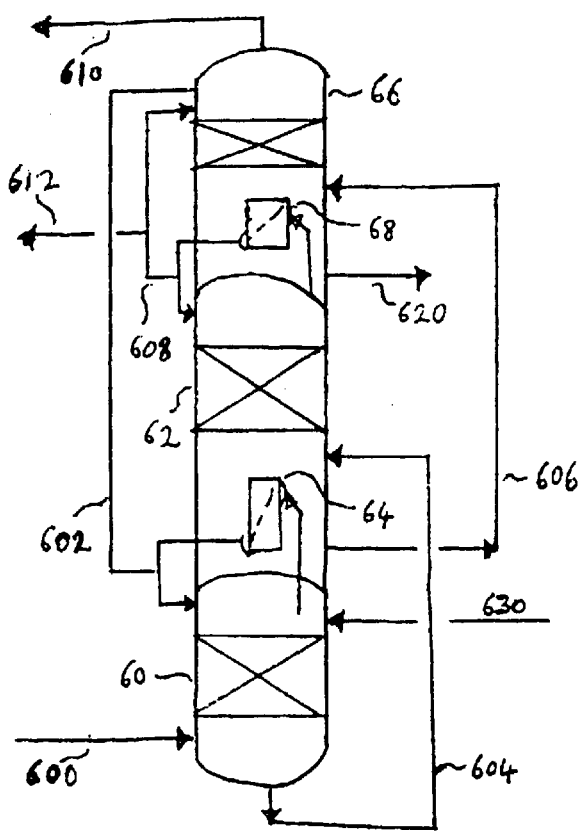
FIG. 6 is a schematic representation of an embodiment of the present invention in which the rare gas recovery system has three distillation columns, each column operating at a different pressure.

FIG. 6 depicts an arrangement of a crude recovery system comprising a HP column 60, a MP column 62 and a LP column 66. A reboiler 64 thermally integrates columns 60 and 62 and a reboiler 68 thermally integrates columns 62 and 66.

Oxygen feed stream 600, containing a greater concentration of krypton and xenon than in atmospheric air, is fed to a lower portion of HP column 60. Stream 600 has a vapor quality of at least 0.9 and is, ideally, in the gaseous state. In HP column 60, separation is effected into a first rare gas-depleted vapor overhead and a first rare gas-enriched bottoms liquid which is passed as feed stream 604 to a lower zone of MP column 62. The overhead vapor from HP column 60 is condensed in reboiler 64. A portion of the resultant condensed stream is used as reflux for HP column 60 and the remaining portion is fed as stream 602 to LP column 66 as reflux (although optionally all or part of this stream could be passed as reflux to MP column 62). A portion of stream 602 can optionally be withdrawn as rare gas-depleted LOX product.

In MP column 62, separation is effected into a second rare gas-depleted overhead vapor and a second rare gas-enriched bottoms liquid which is fed as a feed stream 606 to LP column 66. The second rare gas-depleted overhead vapor from MP column 62 is condensed in reboiler 68. A portion of the resultant condensed stream is used as reflux for MP column 62 and the remaining portion is fed as stream 608 to LP column 66 as reflux. A portion of stream 608 can optionally be withdrawn as rare gas-depleted LOX product stream 612.

In LP column 66, separation is effected into rare gas-lean overhead vapor, which is removed as product stream 610, and rare gas-enriched liquid product which is withdrawn as stream 620 and can be further purified by known methods. Refrigeration for the column system can be provided by injecting a LOX stream in the column system, for example as stream 630 into the top of HP column 60.

Typically, one third of the vapor condensed in each reboiler is passed as reflux to LP column 66 in streams 602 and 608 thereby allowing each of the three columns to operate with an L/V ratio of approximately 0.67. In order to require such a high L/V ratio to prevent loss of krypton, the operating pressure of the columns would have to be high, for example greater than about 30 bar. The pressure difference between the three columns will tend to be small because, for each reboiler, the fluid compositions on each side of the reboiler are similar. Thus, there may be issues in liquid transfer between the columns to be considered. It may prove necessary to use pumps or to inject GOX vapor into the liquid transfer lines (to achieve vapor lift) to accomplish the liquid transfer.

The columns are shown are shown stacked with LP column 66 above MP column 62 which is above HP column 60. However, the invention also applies to arrangements where the columns are side by side or stacked differently, even if HP column 60 is stacked above LP column 66.

Figure 7:
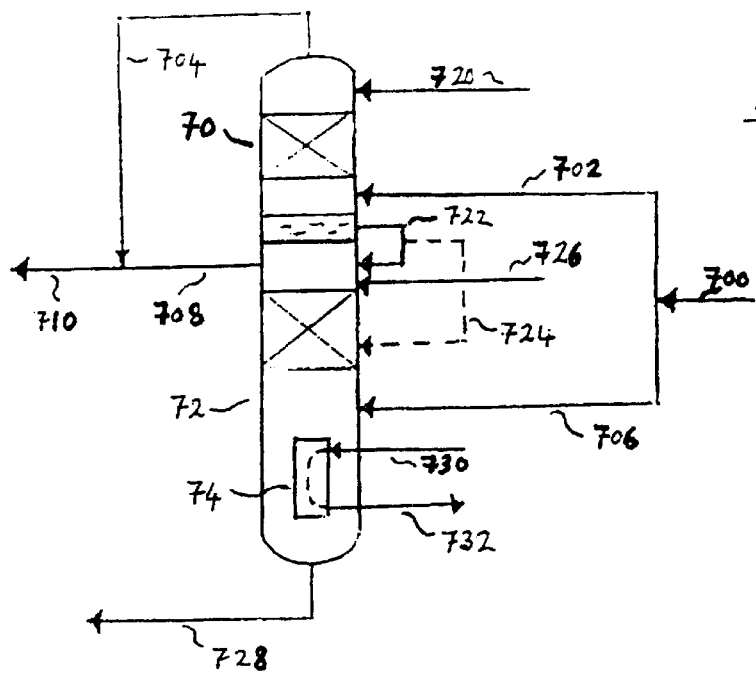
FIG. 7 is a schematic representation of an embodiment of the present invention in which the rare gas recovery system has two distillation columns operating at the same pressure.

The arrangement depicted in FIG. 7 is a crude recovery system comprising two columns 70 and 72 operating at the same pressure. Reboiler 74 is located in a lower zone of column 72. This arrangement demonstrates how the column in FIG. 3 can be reduced in diameter by processing only part (typically half) of the main rare gas-containing oxygen feed in each column. The at least mainly gaseous oxygen feed 700 is divided between the two columns. GOX stream 702 is fed to a lower zone of column 70 where it is contacted by reflux LOX stream 720 to form rare gas-lean GOX, which is removed as stream 704, and rare gas-enriched bottoms liquid, which is removed as stream 722. The remaining fraction of oxygen feed stream 700 is fed as stream 706 to a lower zone of column 72. Reflux for column 72 can be provided by rare gas-enriched liquid as stream 722 and/or by LOX stream 726 (which could be a portion of oxygen feed stream 720. Rather than being used as top reflux for column 72, stream 722 could instead be passed to a lower zone of column 72 as indicated by stream 724.

Column 72 has a reboiler 74 driven by a heating fluid 730, 732 which could be a portion of the compressed air used to vaporize pumped LOX in the main ASU. In column 72, separation is effected into rare gas-lean GOX which is removed as stream 708 and combines with rare gas-lean stream 704 to provide purified oxygen stream 710, and a rare gas-enriched product which is removed as stream 728 and can be further purified by known methods.

Columns 70 and 72 could be separate columns rather than stacked columns as shown. The reboiler 74 could be located outside to the column system, perhaps in its own container. Column 70 could also have its own reboiler and then stream 722 of rare gas-enriched product from column 70 could be combined with stream 728 of rare gas-enriched product from column 72. Either or both of columns 70 and 72 could have more than one contacting section e.g. there could be a bottom section of stages in column 72 below feed stream 706.

By processing half of the vapor feed in each column, the cross-section of the columns would be halved compared to that in FIG. 3.

Figure 8:
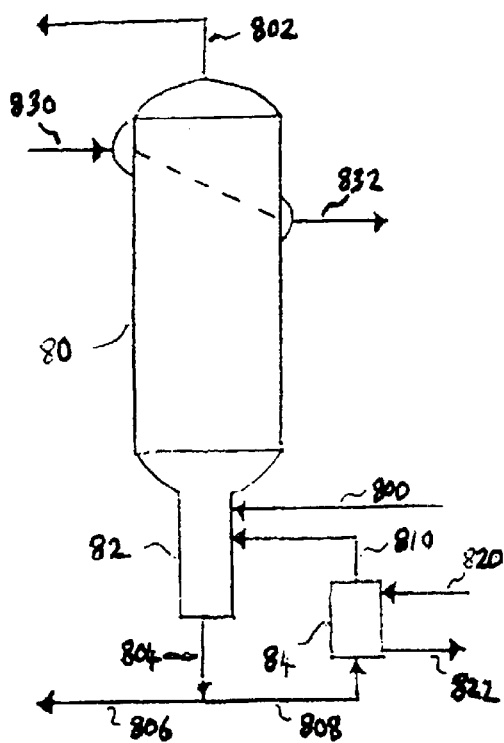
FIG. 8 is a schematic representation of an embodiment of the present invention in which the rare gas recovery system is a heat exchanger.

The embodiment depicted in FIG. 8 is crude recovery system comprising a heat exchanger 80 and a reboiler 84. The exchanger 80 will function largely as a dephlegmator to contact rising GOX vapor with falling LOX to generate a rare gas-enriched bottoms liquid. The primary oxygen feed stream 800, which is at least 90% vapor, is fed to the standpipe section 82 of exchanger 80 and passes up through the passages of the exchanger. It is partially condensed in the exchanger by heat transfer with refrigerant streams 830, 832 and the condensate travels downwards, countercurrent to the rising GOX in the same exchanger passages. A dephlegmating action therefore takes place in the oxygen passages. The LOX contacting the rising GOX effects separation into rare gas-lean GOX overhead removed as stream 802 and rare gas-enriched LOX bottoms liquid removed as stream 804.

A portion 808 of the bottoms liquid can be reboiled as shown in reboiler 84 against a stream 820 of heating fluid (which could be part of the boosted air stream used in the main ASU to boil the pumped LOX) thereby producing condensed stream 822. The reboiled stream 810 (which could be two-phase or all vapor) is returned to the standpipe 82. The remaining bottoms liquid 806 can be withdrawn as product and can be further purified by known methods. If the oxygen feed stream 800 were superheated, then the reboiler 84 may be omitted as the desuperheating of the feed would provide the heat to vaporize some of the falling liquid.

Refrigerant stream 830, 832 does not need to transfer heat with the rising GOX over the full length of the exchanger 80.

In fact, it is preferable that this heat exchange take place only in the upper zone of the heat exchanger 80 as shown thereby resulting in a higher L/V flow ratio for upper zone of the exchanger compared with a case when the heat transfer takes place over a longer zone. The higher L/V ratio reduces the loss of krypton and xenon in the stream 802 of overhead gas. If the exchange of heat with the refrigerant stream 830 occurs only in the upper zone of the exchanger, then the lower zones of the exchanger 80 could form an adiabatic section of the exchanger 80. Although there is no heat transfer in this section, the separation due to the contact of LOX and GOX would still occur.

It is possible to replace or supplement the refrigerant duty by injecting LOX into the GOX passages at upper zone of the exchanger 80. There are several known methods of accomplishing this replacement or supplement.

In FIG. 8, the stream 802 of gaseous overhead leaves the exchanger 80 as saturated vapor, as it has just been partially condensed by refrigerant stream 830. Stream 802 will typically be warmed to ambient temperature against a cooling stream in another exchanger. The additional exchanger could be incorporated as the upper zone of exchanger 80.

Figure 9:
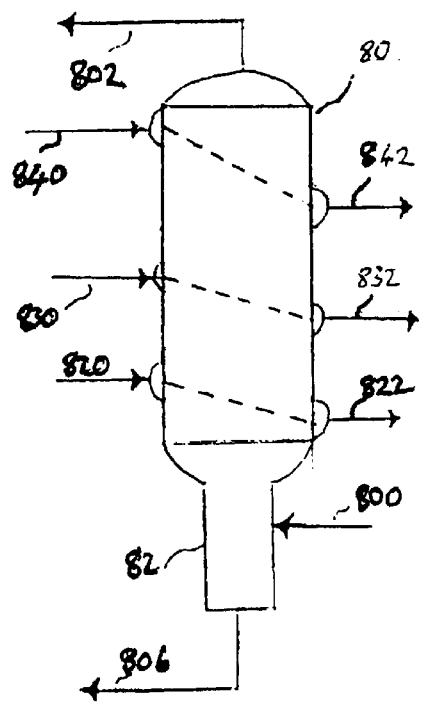
FIG. 9 is a schematic representation of a different arrangement of the embodiment of the present invention depicted in FIG. 8.

The arrangement depicted in FIG. 9 is similar to the arrangement of FIG. 8 and, accordingly, the same numerical legends have been used in FIG. 9 to depict the features that correspond with those of FIG. 8. In FIG. 9, the reboiler 84 of FIG. 8 has been incorporated into the lower zone of exchanger 80 and a upper section has been added to exchanger 80 in which the purified GOX product is warmed against stream 840, 842 of heating fluid.

Figure 10:
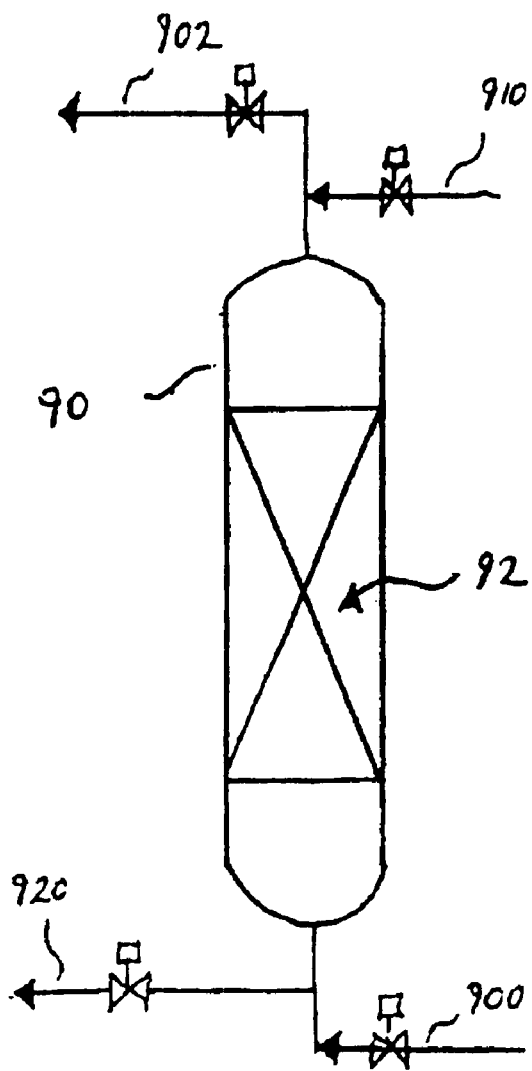
FIG. 10 is a schematic representation of an embodiment of the present invention in which the rare gas recovery system comprises an absorber.

The embodiment depicted in FIG. 10 is a crude recovery system comprising an adsorber vessel 90. GOX feed stream 900 is passed through the adsorber and purified oxygen product exits as stream 902. The temperature of stream 900 may be cryogenic or ambient. Within adsorber 90, xenon and/or krypton is adsorbed on one or more adsorber beds 92. Periodically, the adsorber must be regenerated and the adsorbed rare gas components recovered.

The regeneration process may include depressurization of adsorber vessel 90 and passage of a small quantity of regeneration gas 910 (typically nitrogen) through the adsorber. Regeneration outlet stream 920 is enriched in the rare gas components which have desorbed from the adsorbent and which is withdrawn as product and can be further purified by known methods. This method of regeneration is well-known as pressure swing adsorption ("PSA").

The adsorber 90 can also be regenerated by the well-known method of temperature swing adsorption ("TSA"). The regeneration stream 910 may have been heated in an upstream heater to provide the desorption heat for this well-known method of regeneration. Alternatively (or in addition), heat may be provided by heating elements located at some point within vessel 90, or adsorbent 92.

FIG. 10 depicts a single adsorber vessel 90. Two (or more) vessels can be used, e.g. in parallel, to allow continuous adsorption of rare gas components from feed stream 910.

Optionally, in any of the above figures, one or more adsorbers may be included to at least partially remove hydrocarbons, carbon dioxide or nitrous oxide. Such adsorber can operate to process LOX or GOX feeds to the recovery system, or on intermediate or final GOX or LOX streams of the system.

EXAMPLE

By way of an example of the invention, a simulation of the process depicted in FIG. 1 has been carried out. In the simulation, a xenon-enriched stream is recovered with only secondary importance being given to krypton recovery. The results of the simulation are shown in Table 1.

TABLE 1

| Stream | 100 | 102 | 104 | 108 | 110 | 120 | 140 |
|---|---|---|---|---|---|---|---|
| Phase | liq♣ | liq | liq | vap | vap | liq | |
| Flow (kgmol/h) | 10000 | 10000 | 1500 | 8500 | 9988 | 11.8 | 0.0 |
| Pressure (bar) | 1.7 | 38.6 | | 38.6 | 38.6 | 38.6 | 38.6 |
| Temp (° C.) | −177.8 | −173.4 | −173.4 | −123.3 | −125.5 | −125.4 | |
| % O$_2$ | 99.50 | 99.50 | 99.50 | 99.50 | 99.50 | 99.46 | |
| % Ar | 0.50 | 0.50 | 0.50 | 0.50 | 0.50 | 0.24 | |
| ppm Xe | 0.43 | 0.43 | 0.43 | 0.43 | 0.05 | 319 | |
| ppm Kr | | 5.60 | 5.60 | 5.60 | 5.60 | 4.62 | 84 |
| ppm CH$_4$ | 14.8 | 14.8 | 14.8 | 14.8 | 14.4 | 392 | |

The results indicate that high xenon recovery is achieved despite the very high operating pressure and the low concentration of xenon in the crude recovery column feed. 15% of the total oxygen feed is used as reflux. The remaining portion of the total oxygen feed is the primary column feed in the form of slightly superheated vapor. The volatility of krypton and xenon will be lower at lower pressures, which would tend to reduce the reflux LOX flow requirement.

Throughout the specification, the term "means" in the context of means for carrying out a function is intended to refer to at least one device adapted and/or constructed to carry out that function.

It will be appreciated that the invention is not restricted to the details described above with reference to the preferred embodiments but that numerous modifications and variations can be made without departing from the spirit and scope of the invention as defined by the following claims.

What is claimed is:

1. A process for the recovery of at least one rare gas selected from the group consisting of krypton and xenon from a mixture comprising oxygen and at least one rare gas selected from the group consisting of krypton and xenon, said process comprising:

separating feed air in a cryogenic air separation unit ("ASU") into nitrogen-rich overhead vapor and liquid oxygen ("LOX");

pressurising at least a portion of said LOX to provide pressurized LOX;

at least partially vaporizing at least a portion of said pressurized LOX to provide said mixture such that at least about 50 mol % of said mixture is in the gaseous phase;

feeding said mixture or a mixture derived therefrom at a pressure greater than the pressure of the part of the ASU producing said LOX to a rare gas recovery system; and separating said mixture feed in said rare gas recovery system into rare gas-lean gaseous oxygen ("GOX") and rare gas-enriched product, provided that, when said mixture feed is separated by selective adsorption, the concentration of xenon in the mixture feed is no greater than 50 times the concentration of xenon in air.

2. The process according to claim 1 wherein at least 90 mol % of said mixture feed is gaseous.

3. The process according to claim 1 wherein all of said mixture feed is gaseous.

4. The process according to claim 1 wherein the rare gas-enriched product is enriched with xenon.

5. The process according to claim 1 wherein the rare gas-enriched product is enriched with krypton.

6. The process according to claim 1 wherein the rare gas-enriched product is enriched with both xenon and krypton.

7. The process according to claim 1 further comprising feeding a xenon-enriched stream to the rare gas-recovery system.

8. The process according to claim 7 wherein the xenon-enriched stream is at least partially gaseous.

9. The process according to claim 7 wherein the xenon-enriched stream is liquid.

10. The process according to claim 1 wherein the pressure of the mixture is increased before being fed to the rare gas recovery system.

11. The process according to claim 1 wherein all of said at least a portion of said pressurized LOX is vaporized to produce said mixture.

12. The process according to claim 1 wherein a stream of said LOX is divided into at least two portions, each portion being vaporized at different pressures before being fed to the rare gas recovery system.

13. The process according to claim 1 wherein the rare gas recovery system is a gas-liquid contact separation system, said process further comprising contacting said mixture feed with LOX in the separation system to effect the separation.

14. The process according to claim 13 wherein the gas-liquid contact separation system is a gas-liquid contact column with no distillation stages, said process comprising passing the mixture feed through LOX in said column to effect the separation.

15. The process according to claim 13 wherein the gas-liquid contact separation system is a distillation system, the process comprising feeding said mixture to the distillation system for separation into said rare gas-lean GOX as overhead vapor and said rare gas-enriched product and feeding LOX to said distillation system as reflux.

16. The process according to claim 15 wherein the mixture is superheated prior to being fed to the distillation system.

17. The process according to claim 15 further comprising:
separating feed air in a cryogenic ASU into nitrogen-rich overhead vapor and LOX;
removing a stream of LOX from the ASU;
pressurizing at least a portion of said LOX stream to produce a stream of pressurized LOX;
dividing said pressurized LOX stream into a major portion and a minor portion;
at least partially vaporizing said major portion to provide said mixture; and
feeding said minor LOX portion to the distillation system as reflux.

18. The process of claim 17 wherein all of said major portion is vaporized to produce said mixture.

19. The process according to claim 17 wherein the distillation system comprises a single distillation column, said process comprising feeding said mixture to the column for separation into said rare gas-enriched product and said rare gas-lean GOX and feeding said minor LOX portion to said column as reflux.

20. The process according to claim 15 further comprising:
separating feed air in a cryogenic ASU into nitrogen-rich overhead vapor and LOX;
removing a stream of LOX from the ASU;
pressurizing at least a portion of said LOX stream to produce a stream of pressurized LOX;
at least partially vaporising at least a portion of said pressurized LOX steam to provide said mixture;
condensing at least a portion of said rare gas-lean GOX overhead vapor by indirect heat exchange against a refrigerant to produce condensed overhead; and
feeding at least a portion of the condensed overhead to the distillation system as reflux.

21. The process according to claim 20 wherein all of said at least a portion of said pressurized LOX stream is vaporized to produce said mixture.

22. The process according to claim 20 wherein the distillation system comprises a single distillation column, said process comprising feeding said mixture to the column for separation into said rare gas-enriched product and said rare gas-lean GOX and feeding at least a portion of said condensed overhead to said column as reflux.

23. The process according to claim 15 wherein the distillation system comprises at least a higher pressure ("HP") distillation column and a lower pressure ("LP") distillation column, said HP and LP columns being thermally integrated via a reboiler/condenser, said process comprising:
feeding said mixture to said HP column where it is separated into rare gas-depleted overhead vapor and rare gas-enriched bottoms liquid;
feeding rare gas-enriched bottoms liquid to said LP column after pressure adjustmnent for separation into said rare gas-lean GOX and said rare gas-enriched product;
at least partially condensing rare gas-depleted overhead vapor by indirect heat exchange against rare gas-enriched product to produce at least partially condensed rare gas-depleted overhead;
feeding at least a portion of the at least partially condensed rare gas-depleted overhead to the HP column as reflux; and
feeding liquid from or derived from the HP column to the LP column as reflux.

24. The process according to claim 23 further comprising feeding LOX to the HP column or the LP column as reflux.

25. The process according to claim 24 further comprising separating feed air in a cryogenic ASU into nitrogen-rich overhead vapor and LOX and using a portion of said LOX to provide said LOX reflux.

26. The process according to claim 23 wherein the HP column is reboiled by at least partially vaporizing rare gas-enriched bottoms liquid by indirect heat exchange against a heating fluid.

27. The process according to claim 15 wherein the distillation system comprises at least a higher pressure ("HP") distillation column, a medium pressure ("MP") distillation column and a lower pressure ("LP") distillation column, said HP and MP columns being thermally integrated via a first reboiler/condenser and said MP and LP columns being thermally integrated via a second reboiler/condenser, said process comprising:

feeding said mixture to said HP column where it is separated into first rare gas-depleted overhead vapor and first rare gas-enriched bottoms liquid;

feeding first rare gas-enriched bottoms liquid to said MP column after pressure adjustment for separation into second rare gas-depleted overhead vapor and second rare gas-enriched bottoms liquid;

at least partially condensing first rare gas-depleted overhead vapor by indirect heat exchange against second rare gas-enriched bottoms liquid to produce at least partially condensed first rare gas-depleted overhead;

feeding at least a portion of the at least partially condensed first rare gas-depleted overhead to the HP column as reflux;

feeding liquid from or derived from the HP column to at least one column selected from the LP column and the MP column as reflux;

feeding second rare gas-enriched bottoms liquid to said LP column for separation into said rare gas-lean GOX and said rare gas-enriched product;

at least partially condensing second rare gas-depleted overhead vapor by indirect heat exchange against said rare gas-enriched product to produce at least partially condensed second rare gas-depleted overhead;

feeding at least a portion of the at least partially condensed second rare gas-depleted overhead to the MP column as reflux; and feeding liquid from or derived from the MP column to the LP column as reflux.

28. The process according to claim 27 further comprising feeding LOX to at least one of the columns as reflux.

29. The process according to claim 28 further comprising separating feed air in a cryogenic ASU into nitrogen-rich overhead vapor and LOX and using a portion of said LOX to provide said LOX reflux.

30. The process according to claim 15 wherein the distillation system comprises at least a first distillation column and a second distillation column, said first and second columns operating at the same pressure, said process comprising:

feeding said mixture to said first column for separation into rare gas-lean GOX and rare gas-enriched product;

feeding said mixture to said second column for separation into rare gas-lean GOX and rare gas-enriched product;

feeding LOX to said first column as reflux; and feeding at least one liquid selected from the group consisting of rare gas-enriched product from the first column and LOX to said second column as reflux.

31. The process according to claim 30 further comprising dividing a stream of said mixture into two equal portions and feeding one portion to each column.

32. The process according to claim 1 wherein the concentration of xenon in the mixture feed is no more that 50 times greater than the concentration of xenon in air.

33. The process according to claim 1 wherein the concentration of xenon in the mixture feed is no more that 20 times greater than the concentration of xenon in air.

34. The process according to claim 1 wherein the concentration of xenon in the mixture feed is about 5 times greater than the concentration of xenon in air.

35. The process according to claim 1 wherein the separation is a crude separation and the rare gas-enriched product is further processed to produce at least one product selected from the group consisting of a purified xenon product, a purified krypton product and a purified krypton and xenon product.

36. Apparatus for the recovery of at least one rare gas selected from the group consisting of krypton and xenon from a pressurized mixture comprising oxygen and at least one rare gas selected from the group consisting of krypton and xenon, said apparatus comprising:

a cryogenic ASU for separating feed air into nitrogen-rich overhead vapor and LOX;

pressurizing means for pressurizing at least a portion of said LOX to provide pressurized LOX;

vaporizing means for vaporizing at least about 50 mol % of said pressurized LOX to provide said mixture; and a rare gas recovery system for separating said mixture into rare gas-lean GOX and rare gas-enriched product.

37. Apparatus according to claim 36 wherein the rare gas recovery system is a gas-liquid contact column with no distillation stages for contacting mixture with LOX.

38. Apparatus according to claim 36 wherein the rare gas recovery system is a distillation system.

39. Apparatus according to claim 38 further comprising conduit means for feeding a portion of said pressurized LOX from the pressurizing means to the vaporizing means and further conduit means for feeding the remaining portion of said pressurized LOX from the pressurizing means to the distillation system as reflux.

40. Apparatus according to claim 38 further comprising heat exchange means for at least partially condensing a portion of said rare gas-lean GOX overhead against a refrigerant to provide at least partially condensed rare gas-lean GOX overhead and conduit means for feeding at least a portion of said at least partially condensed overhead to the distillation system as reflux.

41. Apparatus according to claim 38 further comprising:

a first distillation column for separating mixture into rare gas-lean GOX and rare gas-enriched product;

a second distillation column for separating mixture into rare gas-lean GOX and rare gas-enriched product at the same pressure as said first distillation column;

conduit means for feeding LOX to at least one of the distillation columns as reflux; and conduit means for feeding at least one liquid selected from the group consisting of rare gas-enriched product from the first distillation column and LOX to the second distillation column.

* * * * *